F. J. RANDALL.
MEANS FOR PRODUCING LUBRICATING BEARINGS.
APPLICATION FILED OCT. 30, 1907.
936,739.
Patented Oct. 12, 1909.
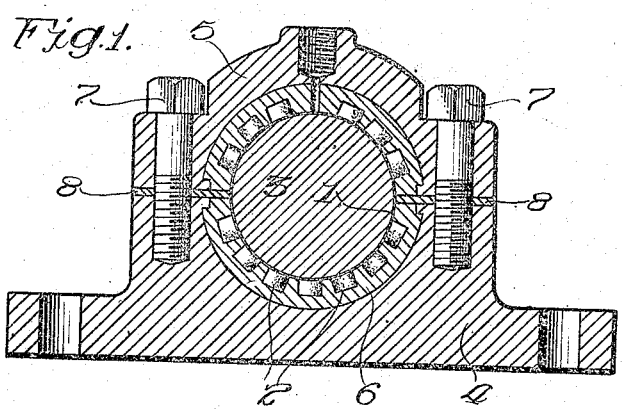
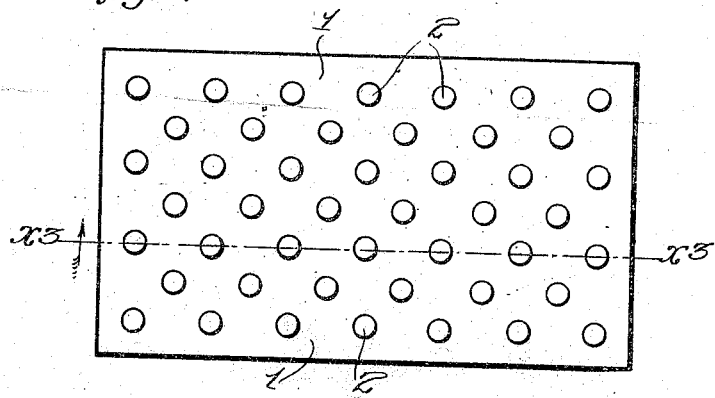
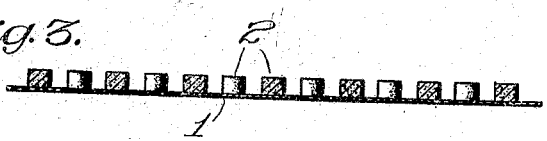
Witnesses:
C. J. Williams
W. B. Townsend.
Inventor
Frank J. Randall
By James R. Townsend
his attorney

UNITED STATES PATENT OFFICE.

FRANK J. RANDALL, OF LOS ANGELES, CALIFORNIA.

MEANS FOR PRODUCING LUBRICATING-BEARINGS.

936,739.  Specification of Letters Patent.  Patented Oct. 12, 1909.

Application filed October 30, 1907. Serial No. 399,933.

*To all whom it may concern:*

Be it known that I, FRANK J. RANDALL, a citizen of the United States, residing at Los Angeles, in the county of Los Angeles and State of California, have invented a new and useful Means for Producing Lubricating-Bearings, of which the following is a specification.

The object of this invention is to provide in the simplest and cheapest manner for journal boxes an antifriction bearing consisting of Babbitt or other bearing metal containing lubricating tablets or bodies; at the same time making provision against any liability of binding upon the journal.

Another object is to provide means whereby the bearing metal may be cast without obstruction around the lubricating tablets or bodies.

Another object is to provide means whereby lubricating bodies of very slight thickness can be readily incorporated in the bearing face of a journal bearing.

The invention includes a sheet adapted to be conformed to the journal, and lubricating tablets or bodies detachably attached thereto, whereby when the sheet is applied against the journal and the same is brought to position inside the journal-box the lubricating bodies will radiate around the journal into the space between the journal and its box so that when the Babbitt or other metal for forming the bearing is poured into the box the lubricating bodies will be surrounded thereby and the babbitt can wholly fill the otherwise unoccupied space in the box.

A further object of the invention is to facilitate the production of solid lubricating bearings and to make provision whereby there will be no interference to the flow of the babbitt over the face of the bed or supporting surface which is to support the babbitt when the bearing has been cast, so that when the bearing has been cast it will be solid throughout and will contain the lubricating bodies or buttons properly disposed on and in the bearing surface; and this is done by providing a sheet which, in the process of casting the babbitt in the bearing, will hold the lubricating bodies free from the bed or face which is to form the support of the babbitt after the same is cast, so that when the casting of the babbitt has been effected a solid body of babbitt will rest upon said support.

I have discovered that these objects may be attained by providing for the lubricating buttons or bodies a support in the form of a sheet which is detachably bonded or fastened to the surface of the lubricating buttons that is to come into contact with the body to be lubricated, so that after the casting has been effected the sheet may be gotten out of the way, thus allowing the body that is to be lubricated to rest upon the babbitt at the surface of which the faces of said buttons are exposed.

Another object of this invention is to provide means whereby the babbitt may be readily poured all around the journal and lubricating bodies at once in the box and cap.

Other objects, advantages and features of novelty may appear from the subjoined description.

The accompanying drawings illustrate the invention.

Figure 1 is a cross-section of a journal and its box with cap thereon, with babbitt poured all around the journal. Fig. 2 is a plan of a lubricating sheet embodying a part of this invention. Fig. 3 is a section on line $x^3$—$x^3$, Fig. 2 the thickness of the paper being exaggerated.

1 is a sheet of paper which is adapted to be bent onto and to fit the journal and may be of any desired thickness and kind, as for instance, common writing paper, wrapping-paper, Manila paper, asbestos paper, etc.

2 designates lubricating bodies of graphite or other solid or semi-solid lubricant detachably affixed to one plain surface of the paper, said paper being detachable therefrom, either by reason of its own weakness, or the weakness of the bond formed between the same and the lubricant.

3 is a journal, 4 a box; 5 a cap; 6 the bearing metal; 7 the screws that fasten the cap and box together, and 8 the paste board or other fillers between the box and cap.

In practice, the lubricant may be readily attached to the paper by applying the same while in a plastic state, to the paper and allowing the lubricant to become set thereon. In this manner the lubricant upon hardening becomes sufficiently attached, being adhesively connected to the paper to hold its place and radiate therefrom and from the journal when the sheet of paper is applied against the journal and fastened thereard. The lubricating sheets thus manufactured may be placed on the market for the use of those having the care and attention of machinery requiring the same. The lubricating sheets thus formed may be of any convenient size or shape, and may be manufactured in quantities and kept in stock for indefinite periods.

To form an antifriction bearing for a journal, the workman may take one of the sheets, cut off enough to go half way or entirely around the journal and not quite but almost equal in length to the length of the journal;—say ½ inch or so shorter. He will then wrap the journal therewith, the paper being in contact with the journal, and will fasten the sheet with wire, with string, or with an adhesive, as glue on the paper by which he may stick it on to the journal which he will then lay in the boxes, and will proceed to pour the bearing metal in the usual way; or he may cut off enough to go all around the journal circumference and fasten the same with glue, string, or fine wire, then place the journal and its coating in the box and proceed to babbitt the same as in the ordinary way. The cap can be taken off by simply breaking the paper. Where the cap and box join together, the operator may have to pick the lubricating buttons or bodies off so that the packing may be set up against the shaft to divide the bottom box and the cap. He may then pour the molten bearing metal the same as in the usual way. He may then break the paper on each side to get the cap off. After the Babbitt or other bearing metal has been poured, the journal may be removed and the paper torn off or scraped out, whereupon the journal may be replaced and the bearing is ready for use, the approximately smooth plain paper face, having served to mold the bearing metal to a true surface with which the lubricant faces are flush. The sheet 1 by which the solid lubricating bodies 2 are held, as above stated, serves to accommodate the change of size caused by the contraction, on cooling of the metal which forms the bearing, so that when the paper has been removed after the bearing has been cast, the bearing will fit the journal without binding.

For lubricating flat surfaces for slideways and the like, the lubricating sheet will be applied flat to the surface to be lubricated, and the Babbitt or other metal will be poured onto the sheet and around the lubricating bodies in the manner well understood in the art. Then the sheet may be stripped off of the bearing surface.

By the means shown lubricating bodies of very slight thickness may be incorporated at slight expense in the bearing face. Since one face of each of the lubricating bodies is in contact with and is fastened to one face of the sheet, and the sheet is of uniform thickness, the stripping off of the sheet from the bodies, when the bearing metal has been cast therearound, leaves a true bearing face having permanently embedded lubricating bodies.

For casting boxes of bronze, brass, or other metals of high melting temperatures the asbestos paper will resist the necessarily high heat. The sheet may be of any material on the surface of which the lubricant can be fastened. Thin cloth treated with heat resisting or other fillers or otherwise fitted for the purpose may be employed where necessary or desirable with greater or less degrees of success.

It is thus seen that the lubricating bodies are detachably affixed to a bendable sheet having a surface sufficiently dense to be impervious to molten Babbitt metal or the like, so that semi-solid lubricating bodies may be embedded in the metal portion of the bearing, and may be exposed on the inner face of such bearing, and the bendable sheet may be stripped from the concave surface of the metal bearing and from the lubricating bodies, thus leaving a smooth concave bearing surface having semi-solid lubricating bodies exposed therein which do not extend entirely through the babbitt.

I claim:—

1. A bendable imperforate sheet having a dense surface and lubricating bodies detachably affixed to said surface on only one side of the sheet substantially as and for the purpose set forth.

2. A bendable sheet impervious to molten Babbitt metal and lubricating bodies adhesively connected therewith on only one side thereof substantially and for the purpose set forth.

3. A sheet of paper provided upon one face with lubricating bodies stuck thereon.

4. A sheet provided with lubricating bodies, a face of each of which is fastened to one face of said sheet; said sheet being adapted to be torn from the lubricating bodies when such bodies are embedded in the metal of a bearing.

5. A sheet and lubricating bodies spaced apart on a plain face thereof, a face of each of said bodies being in contact with and fastened to said face of said sheet.

6. A sheet of asbestos provided with lubricating bodies thereon.

7. Lubricating bodies and a sheet of asbestos paper for holding the same spaced apart.

In testimony whereof, I have hereunto set my hand at Los Angeles, California, this 21st day of October, 1907.

FRANK J. RANDALL.

In presence of—
TILLIE E. ADAM,
M. BEULAH TOWNSEND.